United States Patent
Hong

Patent Number: 5,855,365
Date of Patent: Jan. 5, 1999

[54] ENGINE CLAMPING APPARATUS

[75] Inventor: Sun-Gi Hong, Ulsan-shi, Rep. of Korea

[73] Assignee: Hyundai Motor Company, Seoul, Rep. of Korea

[21] Appl. No.: 873,460

[22] Filed: Jun. 12, 1997

[30] Foreign Application Priority Data

Jun. 14, 1996 [KR] Rep. of Korea ................ 1996-21373

[51] Int. Cl.⁶ .................................................. B23Q 3/08
[52] U.S. Cl. .............................. 269/32; 74/104; 269/27; 269/33
[58] Field of Search ................................. 269/32, 33, 27, 269/24; 254/93 R, 89 H, 133 R; 74/104, 102; 192/143; 91/419; 92/62

[56] References Cited

U.S. PATENT DOCUMENTS

| | | | |
|---|---|---|---|
| 2,795,934 | 6/1957 | Jenkins ................................. | 254/93 R |
| 2,795,935 | 6/1957 | Fitzgerald .............................. | 254/93 R |
| 3,710,690 | 1/1973 | Dye ....................................... | 92/62 |
| 4,508,327 | 4/1985 | Ersoy .................................... | 269/27 |
| 4,893,704 | 1/1990 | Fry et al. ............................... | 192/143 |
| 5,074,325 | 12/1991 | Rumberger et al. ................... | 74/102 |

FOREIGN PATENT DOCUMENTS 5-40908  10/1993  Japan.

*Primary Examiner*—David A. Scherbel
*Assistant Examiner*—Lee Wilson
*Attorney, Agent, or Firm*—Finnegan, Henderson, Farabow, Garrett & Dunner, L.L.P.

[57] ABSTRACT

An engine clamping apparatus is provided for firmly fixing engines having different fixing points. The invention includes a cylinder serially accommodating an upper and lower piston for providing a shorter rising stroke when supplying an oil pressure so that a rising stroke of the lower piston pushes up the upper piston, than upon supplying the oil pressure so as to push up only the upper piston. The engine clamping apparatus also includes an operating rod extended to top portion of the upper piston, a groove formed in a side of a body of the operating rod, a rotating grip pivotable about a hinge shaft and having one end bound in the groove, and a fixing bar horizontally projected at a free end of the rotating grip, the fixing bar being pushed into a fixing hole of an engine so as to fix the engine when the operating rod is raised and a free end of the rotating grip is lowered.

3 Claims, 4 Drawing Sheets

ENGINE CLAMPING APPARATUS

BACKGROUND OF THE INVENTION

1. Field of the Invention

The present invention relates to a clamp for holding both sides of an engine to be worked, and more particularly, to a clamping apparatus which is adjustable to clamp engines of different sizes and shapes.

2. Description of the Related Art

Generally, in order to work an engine both side surfaces of the engine are clamped by a predetermined pressure for preventing vibration during the working operation.

In order to avoid moving the engine sideways, a clamping apparatus is provided which is designed to mate with a fixing region of the engine along an operating line.

A problem exists that engines used for one ton commercial vehicles and bus type vehicles, while similar in shape, require a separate clamping apparatus to fix their respective engines.

The large and extremely complicated structure of conventional clamping apparatus results in a loose fixation and deformation in a thrust direction during working.

OBJECT AND SUMMARY OF THE INVENTION

Therefore, an object of the present invention includes providing an engine clamping apparatus capable of firmly fixing engines of different types having different fixing points.

Another object of the present invention includes providing a low cost, simple engine clamping apparatus having a cylinder for operating in multiple steps, whereby the conventional number of devices is reduced and the lay-out is improved.

In order to attain such objects, the present invention includes a cylinder serially receiving an upper and lower piston for providing a shorter rising stroke upon supplying an oil pressure so that a rising stroke of the lower piston pushes up the upper piston, than upon supplying the oil pressure so as to push up only the upper piston. The engine clamping apparatus also includes an operating rod extended from a top portion of the upper piston, a groove formed in a side of a body of the operating rod, a rotating grip having one end bound to the groove and pivotable about a hinge shaft upon rising and falling of the operating rod, and a fixing bar horizontally projected at a free end of the rotating grip. The fixing bar being pushed into a fixing hole of an engine to fix the engine when the operating rod is raised and free end of the rotating grip is lowered.

DETAILED DESCRIPTION OF PREFERRED EMBODIMENT

The preferred embodiment of the present invention will be described more in detail with reference to the accompanying drawings.

Figure 1:
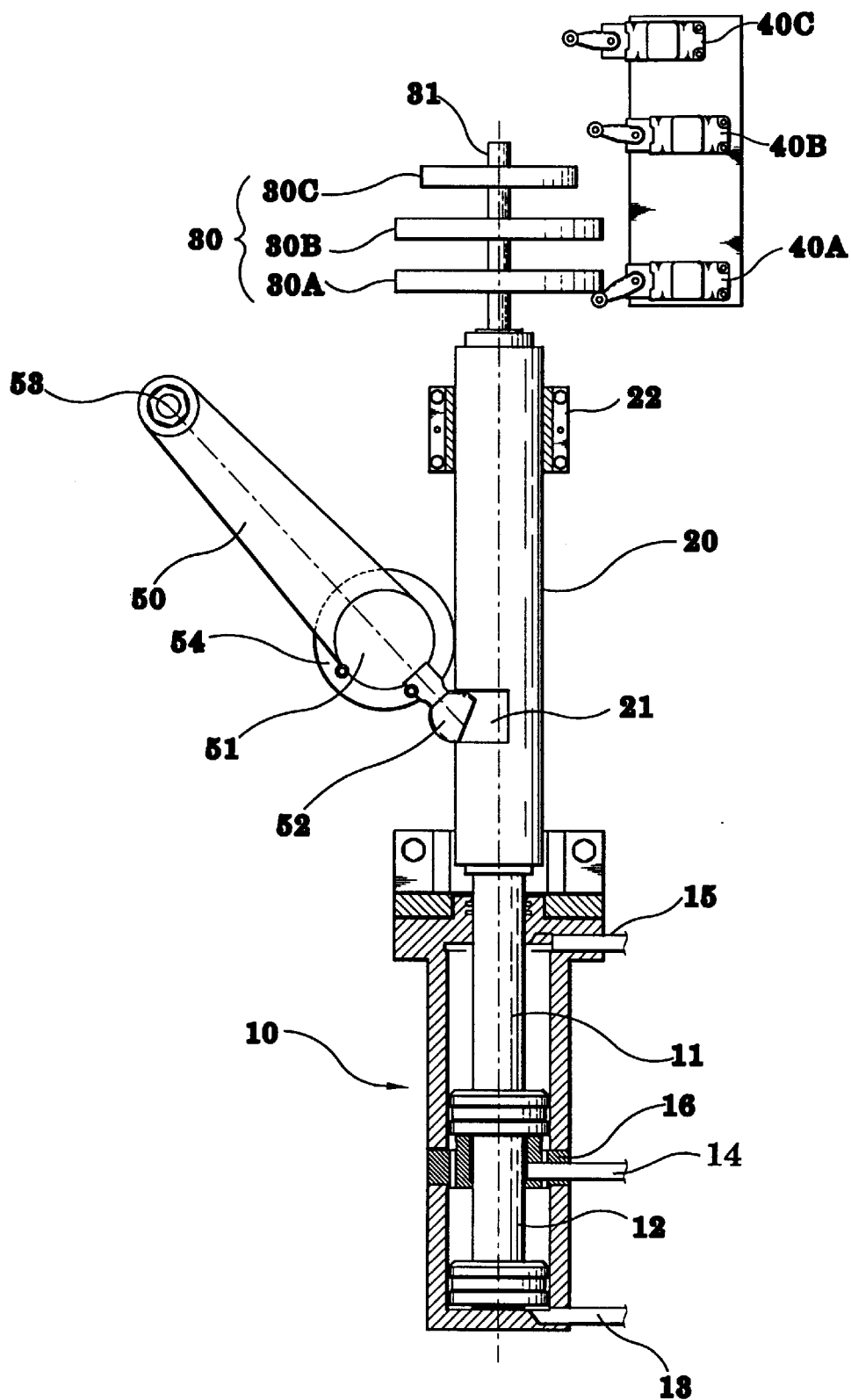
FIG. 1 illustrates a partial section view of an engine clamping apparatus according to an embodiment of the present invention.

FIG. 1 illustrates a cylinder 10, operating rod 20, stopper plate 30, limit switch 40, and rotating grip 50. The cylinder 10 is designed so that an upper and lower piston 11, 12 provide different drawing strokes in response to a selective supply of oil pressure. A drawing length of the upper piston 11 is designed to be different in response to the supply location of an oil pressure.

An operating rod 20 is connected to a top end portion of the upper piston 11 and moved by the operation of the cylinder 10 and guided and supported by a bracket 22. A groove 21 is formed in the operating rod 20 at a predetermined depth.

A fixed shaft 31 is connected to a top end portion of the operating rod 20, and a number of stopper plates 30 are provided at predetermined distance intervals along the fixed shaft 31. A plurality of limit switches 40 are mounted at one side of the stopper plates 30 so as to control an operation of the cylinder 10. The limit switches control the power to the pistons based upon contact with the stopper plates 30. Each limit switch 40A, 40B, 40C corresponds to a stopper plate 30A, 30B, 30C.

Accordingly, a downward operation of the cylinder 10 is discontinued when a lower end stopper plate 30A contacts the lower limit switch 40A of the limit switches 40. An upward operation of the cylinder 10 is discontinued when stopper plates 30B, 30C contact the limit switches 40B, 40C. The upward operation of the cylinder stops when the oil pressure supplied to raise only the upper piston 11 produces contact of the upper limit switch 40C with the upper stopper plate 30C. An upward limit also results when the oil pressure is supplied to raise the upper piston 11 by movement of the lower piston 12 and the middle stopper plate 30B contacts the middle limit switch 40B.

The rotating grip 50 is fixed to the operating rod 20 so as to pivot. A protuberance 52 bounded by the operating rod groove 21 projects at one side of a hinge shaft 51 of the rotating grip 50. The hinge shaft 51 is pivotably connected to a fixed supporting member 54. When the operating rod 20 raises the protuberance 52 bound in the groove 21 the rotating grip 50 pivots about the hinge shaft 51 resulting in a downward movement of a free end of the rotating grip.

Further, a fixing bar 53 is provided at the free end of the rotating grip 50. The fixing bar 53 is aligned with a fixing hole 61 of the engine 60 for seating when the rotating grip 50 is pivoted downward.

The operating unit described above presses and fixes the engine 60 from two sides, wherein two units are utilized as one apparatus. Although a second unit is not illustrated, cylinders 10 are located at two sides of the engine and are independently controllable.

The operating oil supplied to the cylinder 10 is supplied through a first and second solenoid valves 70. The upward and downward movement of the upper and lower pistons 11, 12 is executed by selectively opening and closing the first and second solenoid valves 70.

Figure 2:
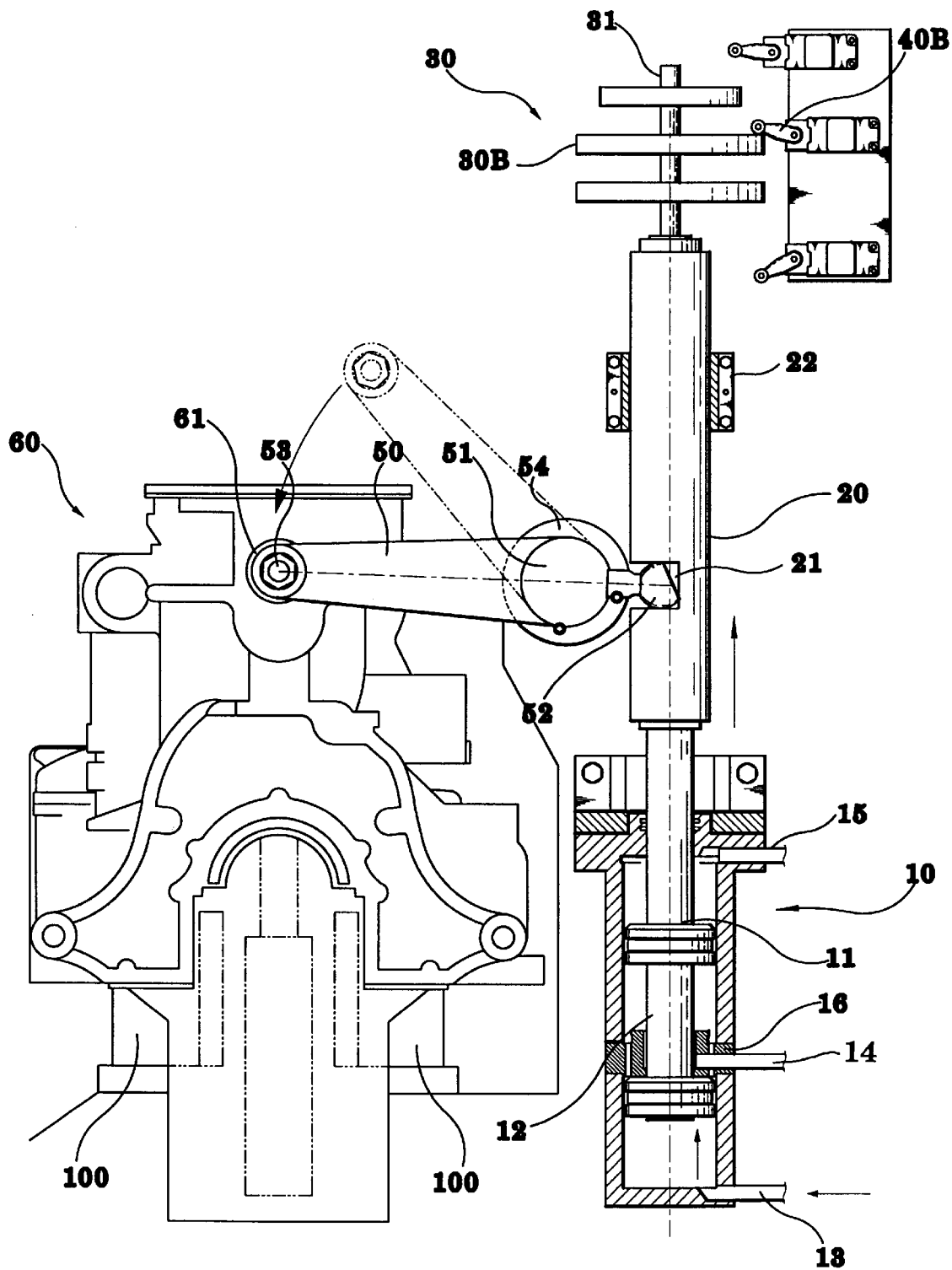
FIG. 2 illustrates the engine clamping apparatus of FIG. 1 in an engine clamping state utilizing the lower piston.
Figure 3:
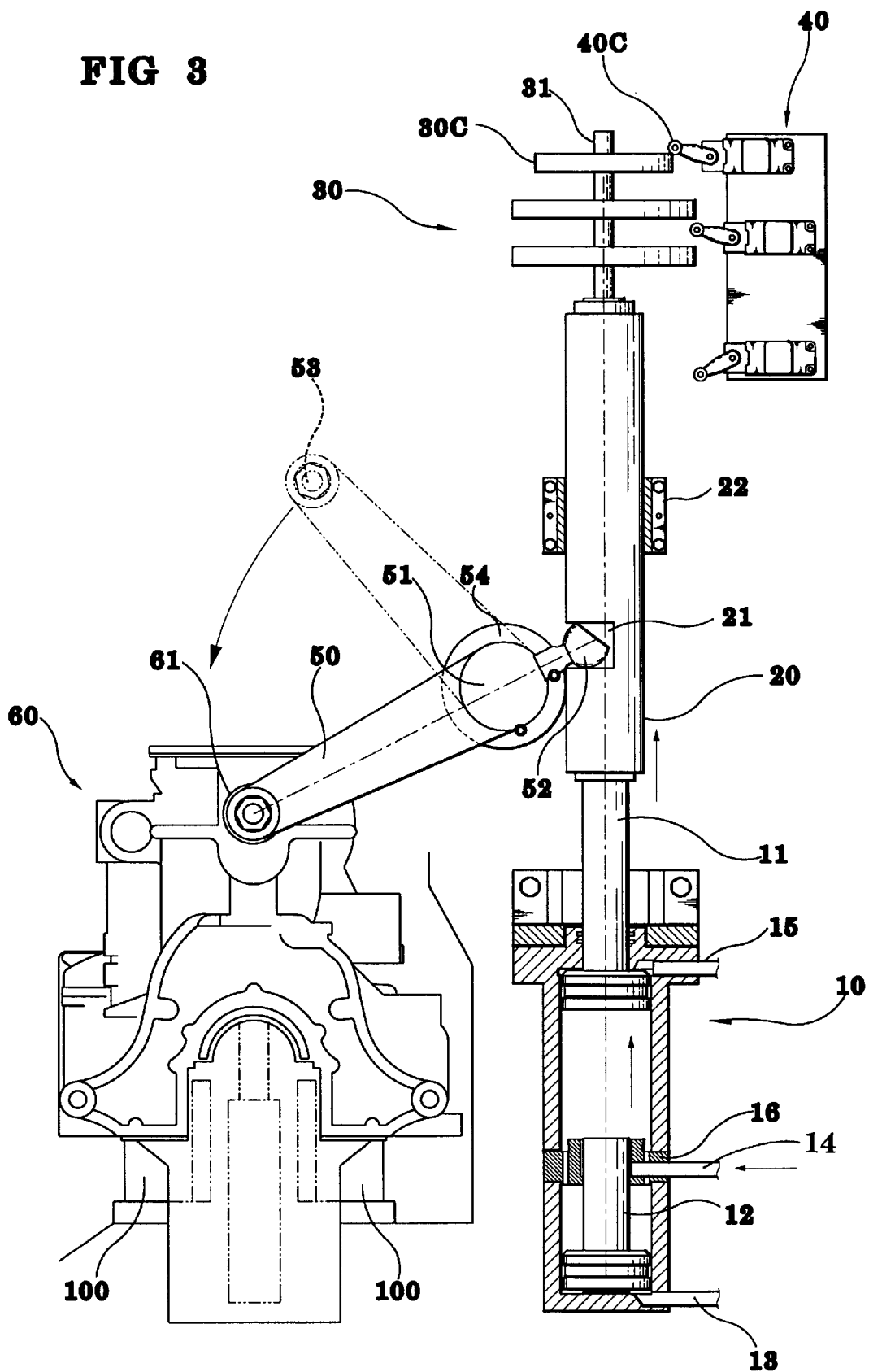
FIG. 3 illustrates the engine clamping apparatus of FIG. 1 in an engine clamping state utilizing only the upper piston.
Figure 4:
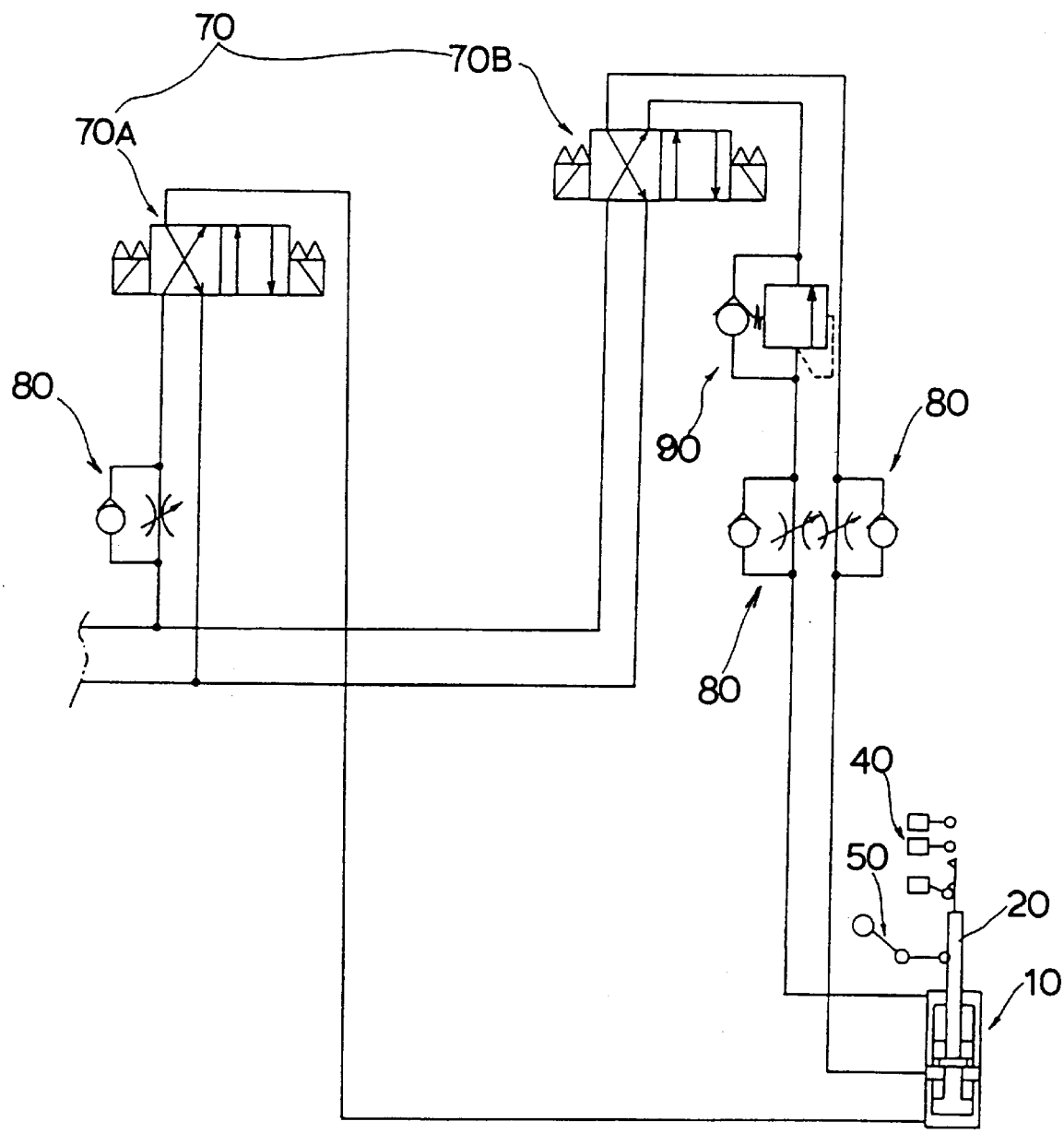
FIG. 4 illustrates an oil pressure circuit diagram for the engine clamping apparatus

Reference numeral symbol 80 (FIG. 4) is a flow quantity control valve, reference numeral 90 (FIG. 4) is a sequencing valve, and reference numeral 100 (FIGS. 1–3) identifies splints for supporting the engine.

The operation of the present invention in accordance with the illustrated embodiment is as follows. When an engine 60 is conveyed to the engine clamping apparatus along a conveyor line for working, the type of the engine 60 is determined so as to properly locate the upper piston 11 and/or lower piston 12. As a result, when the fixing hole 61 of the engine is located at a relatively high position, the oil pressure is supplied to raise the upper piston 11 by movement of the short upward stroke of the lower piston 12. (See FIG. 2.) In such a situation, the first solenoid valve 70A is opened and the operating oil is flowed into the cylinder 10 through the lower oil inlet/outlet 13, thereby raising the lower piston 12. When the lower piston 12 is raised, the upper piston 11 is contacted and pushed upwardly. When the lower piston 12 is stopped by contact with a middle sill 16, a middle stopper plate 30B of the operating rod 20 contacts a middle limit switch 40B and the first solenoid valve 70A closes and cuts off a supply of operating oil to the inlet/outlet 13.

When the operating rod 20 is raised, the protuberance 52 bound by the groove 21 is raised and the rotating grip 50 pivots about the hinge shaft 51. When the fixing bar 53 of both cylinders engages the two fixing holes 61 of the engine, the engine is fixed.

When the working of the engine is completed, the cylinders 10 are operated to release the fixed state so that the fixing bars 53 engaging the fixing holes 61 are withdrawn. Thereafter, the second solenoid valve 70B is opened and operating oil is flowed into the cylinder 10 through the upper oil inlet/outlet 15. The upper piston 11 and the lower piston 12 are then lowered. The operating oil used for pushing up the pistons 11, 12 exists through a middle oil inlet/outlet 14 and a lower oil inlet/outlet 13 and returned to a storage tank.

When the lower piston 12 reaches a lowermost point, the lower stopper plate 30A contacts the lower limit switch 40A and the second solenoid valve 70B is closed. As a result of the second solenoid valve being cut off, a supply of operating oil through the upper oil inlet/outlet 15 is stopped.

When the upper and lower pistons 11, 12 are lowered, the protuberance 52 by the groove 21 is lowered and the free end of the rotating grip 50 pivots to an upper position, as illustrated in FIG. 1.

The operation of engine clamping apparatus will now be explained with regard to another type of engine, an engine 60 of a type having a lower fixing hole 61 than the previous engine 60. When a location of the fixing hole is lower than the previously described engine, the operating oil is supplied into the cylinder 10 through the middle oil inlet/outlet 14 of the cylinder 10. This is accomplished by controlling the second solenoid valve 70B. The lower piston 12 remains at a lowermost point, and only the upper piston 11, being separate from the lower piston 12, is raised. During the upward movement of the upper piston 11, operating oil is compressed and returned through the upper oil inlet/outlet 15.

The upper stopper plate 30C of the fixed shaft 31 contacts the upper limit switch 40C when the upper piston 11 reaches a top-most point. At this point, the second solenoid valve 70B is closed and the supply of the operating oil to the oil inlet/outlet 14 is stopped.

Thus, when the operating rod 20 is raised to a top-most position, a pivot angle of the rotating grip 50 is larger than that for the previous fixing hole location. The position of its fixing bar 53 is therefore lower than before.

As before, when the fixing bar 53 engages the fixing hole 61 of the engine 60, the engine 60 is fixed.

Although the illustrated embodiment sets forth a two step operation for clamping two kinds of engines having different fixing hole positions, it is possible in light of the present invention to provide, for instance, a piston which provides three or more steps. Such an embodiment would provide a gradual stroke from the upper piston to the lower piston. Also, an engine clamping apparatus for engines having more than three different fixing hole positions is also possible.

EFFECT OF THE INVENTION

The present invention provides for different rotating angles of the fixing grips by selectively operating the upper and lower pistons in different strokes, so that engines having different fixing hole positions can be fixed. Such an invention reduces the cost and equipment necessary to fix such engines.

What is claimed is:

1. An engine clamping apparatus comprising:

a cylinder serially accommodating an upper and lower piston for providing a shorter upward stroke when supplying an oil pressure so that a rising stroke of the lower piston raises the upper piston, than upon supplying oil pressure to raise only the upper piston;

an operating rod extended from a top portion of the upper piston;

a groove formed at one side of a body of the operating rod;

a rotating grip having one end bounded in the groove and pivoting about a hinge shaft upon a rising and falling of the operating rod; and a fixing bar horizontally projected at a free end of the rotating grip for pushing into a fixing hole of an engine so as to fix the engine when the operating rod is raised and a free end of the rotating grip is lowered.

2. An engine clamping apparatus as defined in claim 1, including a plurality of stopper plates and limit switches for limiting upper and lower operating distances of said operating rod.

3. An engine clamping apparatus as defined in claim 1, wherein cylinders are located symmetrically at two sides of the engine and, upon fixing the engine, said cylinders are respectively moved toward the engine and said fixing bar is pushed and engaged with fixing holes of the engine.

* * * * *